UNITED STATES PATENT OFFICE.

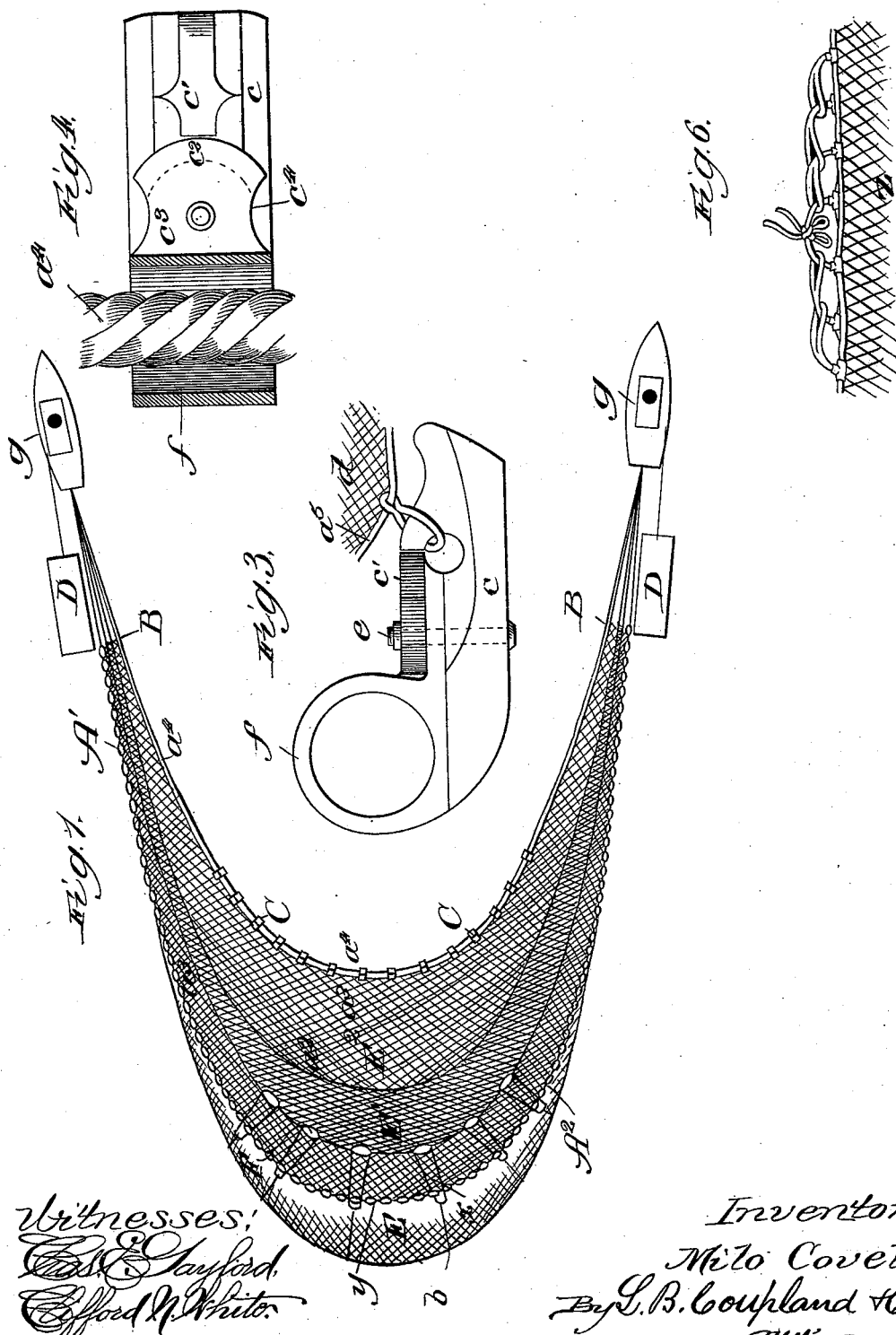

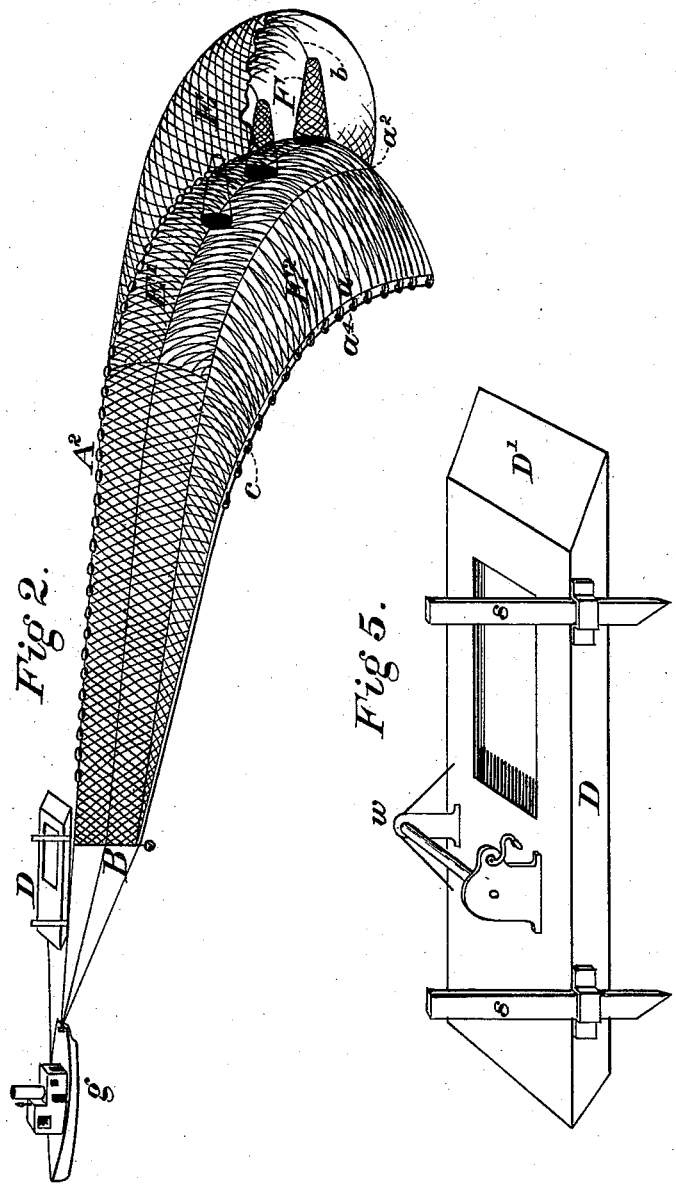

MILO COVEL, OF CHICAGO, ILLINOIS.

FISH TRAP OR NET.

SPECIFICATION forming part of Letters Patent No. 466,489, dated January 5, 1892.

Application filed January 26, 1891. Serial No. 379,215. (No model.)

*To all whom it may concern:*

Be it known that I, MILO COVEL, of Chicago, Cook county, and State of Illinois, have invented a new and useful Improvement in Fish Traps or Nets, of which the following is a specification.

The object of my invention is to construct a floating fish trap or net which is also specially adapted for large fish and deep-sea fishing, combined with means for operating the same in such manner as to enable the same to be used both in shoal or deep water as well as with or against the tide, up or down stream; and this object I accomplish by the means shown in the accompanying drawings, forming a part hereof, in which—

Figure 1 is a top view of a floating fish trap or net, also showing means for operating with the same. Fig. 2 is a side elevation showing an interior view of half a net as it appears when in use. Fig. 3 is an enlarged side elevation of a shoe or weight C. Fig. 4 is a plan view of the same, said last two figures being drawn nearly full size. Fig. 5 is a perspective view of a tender or flat-boat used in connection with a net and trap for operating the same, and Fig. 6 is a detail showing an enlarged view of the means for fastening the main body of the net and the upper part of the bag or trap E.

Like letters refer to like parts.

Two tenders or flat-boats are best used with my net and trap, one of them being attached at each lead end of the net, and constitute an essential part of the appliances for casting or taking in the net while at sea, for although the net could be drawn out upon the land my invention is more especially designed for fishing while the whole appliance is on the water.
Of the net, A and A′ represent the lead ends, the strands being gathered together and fastened to two small propellers $g$ or other means for dragging the net through the water.

$A^2$ is the cork or float-line, to which the buoys or floats for suspending the net are attached.

The ends of the body of the net are attached to brails B, which may consist of a suitable rod or bar or other contrivance. These are secured to said tenders, as shown, and thus not only spread the net ends apart, but also keep the same suspended in an upright position while making a haul. The lead or shoe line $a^5$, to which the shoes C or other weights are attached, rests or drags upon the bottom of the water, or else in deep water sinks to the width of the net and keeps the latter vertically extended.

$a^2$ is a supporting-line running through the net where the bag or trap E is attached. $a^3$ is a line running through the center and around such bag or trap to give support to the netting, and $a^4$ is a safety or snag line. This last-mentioned line should be of sufficient strength to stop the propelling-boats should it get caught cr come in contact with any heavy bodies which might tear the net-work, and thus protects the latter from injury. This line has also another function in this that being connected with the net by the shoes C it prevents the lower edge of the net from rolling up, as is usually the case where but a single line is used. I prefer to use for this line a wire cable, which would at the same time serve as a weight. This safety or snag line is separately attached to the boats used for dragging the nets. The other lines are gathered together a short distance from the brail B, to which also both the float and lead lines are attached.

E′ is the bunting or main body of the net, which is connected with and surrounded by the bag or trap E, the same having funnel-shaped passage-ways leading from such main net into said trap E, through which the fish enter the latter. The size and shape of said funnel-shaped passage-ways F will be adapted to requirements, the shape shown in the drawings being, however, the most desirable for general use. $E^2$ is an apron or bottom lead to conduct the fish to the said funnel-shaped passage-ways F, such apron extending to the lead-line $a^5$, the width of said apron varying according to the depth of the water, or in deep sea the same could be extended any suitable distance in front of the bunting and trap.

To keep the funnel-shaped passage-ways properly suspended, the same should be secured by a short line $b$, attached to the narrow end thereof, fastened to any convenient rope in the netting of the bag E, as illustrated, such arrangement allowing the fish free passage-way.

Figs. 3 and 4, as aforesaid, show an enlarged view of the shoe or weights C to be used. These are constructed in two pieces connected pivotally one on the other by a rivet $e$, and consist of a bottom piece $c$, provided with a projecting point or lug $c'$, which, in connection with the flange $c^2$ on the upper or swivel piece $c^3$, forms a lock in which a ring $d$, attached to the line $a^5$, may be secured. The shoe is also provided with a large ring $f$, through which the safety or snag line $a^4$, above mentioned, is inserted. Such weight or shoe may be secured on the lead-line $a^5$ by turning the lower piece $c$ thereof to one side, so that the lug $c'$ is brought past the end of the flange $c^2$ to a point $c^4$ which will clear the lug and permit the weights to be readily removed or attached when the net is out of the water. The line $a^4$ and shoe C could also be applied to other nets. Line $a^4$ is also advantageously used when taking the net out of the water to gather up the apron $E^2$, forming a sort of purse-net of the same as the said line is drawn in by hand, while both ends of the net are hauled in together over the tenders, by which means any fish that might still be in that part of the net would be caught.

After a sweep or haul has been made it is not necessary to run ashore if my invention is used in connection with tenders D, above referred to, as the net can be taken up in deep water just as well. Each tender should, however, be provided with at least two anchors or spuds $s$, that can be lowered and raised at will, and should also be provided with a windlass; and when the net is to be raised in deep water both tenders are brought together and made fast and then each end of the net drawn in over the inclined deck $D'$ of its respective tender by means of the windlass $w$ until the bag or trap E is over the opening in the deck of the tender, when the net may be emptied of its contents. During the drawing in the line $a^4$ should be kept taut, so that the apron will be well gathered up to prevent any fish from escaping which have not entered into the trap E. The top of the said bag or trap E is attached to the line $A^2$ by loops or cords from $x$ to $y$, as illustrated in Fig. 6, to provide a ready means for opening such receiver and removing the catch.

My invention is intended more especially for deep-sea fishing; but it is also serviceable in rivers or along shores, being operated in the manner shown. By this arrangement fishing can be made more remunerative and less hazardous.

The device illustrated in Figs. 3 and 4 will form the subject-matter of another application.

Having thus described my invention, now what I claim, and desire to secure by Letters Patent, is—

1. The combination, with a seine or dragnet, of a trap connected thereto and the contracted passages leading into the trap from said seine, substantially as and for the purpose set forth.

2. The combination, with a seine or dragnet, of one or more traps or bags connected thereto, the contracted communicating passages therebetween, and a bottom apron-like extension attached to and moving in advance of said seine, substantially as and for the purpose set forth.

3. The combination, with a seine or dragnet, of a trap or traps attached to the rear part of the seine, the communicating passages, the apron, and the floating tenders or boats connecting with the respective ends of said seine and provided with means for handling the same, substantially as and for the purpose set forth.

4. A fish-trap, seine, or drag-net provided with a safety or snag line connected therewith by weights or shoes C and provided with an apron $E^2$ and a bag or trap E, and funnel-shaped passage-ways F, leading into such bag or trap, in combination with a tender and means for propelling the same, as and for the purposes set forth.

MILO COVEL.

Witnesses:
T. J. GEISLER,
RICHARD BREYER.